(12) United States Patent
Desseix et al.

(10) Patent No.: US 8,682,122 B2
(45) Date of Patent: Mar. 25, 2014

(54) CONCENTRIC INSULATION SLEEVE HAVING INNER AND OUTER SURFACES WITH DIFFERENT PROPERTIES

(75) Inventors: Maryline Desseix, Gambes (BE); Jerome Waeler, Saint Martin le Noeud (FR); Olivier Morin, Montmorency (FR)

(73) Assignee: PolyOne Corporation, Avon Lake, OH (US)

( * ) Notice: Subject to any disclaimer, the term of this patent is extended or adjusted under 35 U.S.C. 154(b) by 110 days.

(21) Appl. No.: 12/679,902

(22) PCT Filed: Sep. 23, 2008

(86) PCT No.: PCT/US2008/077313
§ 371 (c)(1),
(2), (4) Date: Mar. 24, 2010

(87) PCT Pub. No.: WO2009/042566
PCT Pub. Date: Apr. 2, 2009

(65) Prior Publication Data
US 2010/0195963 A1     Aug. 5, 2010

Related U.S. Application Data

(60) Provisional application No. 60/974,863, filed on Sep. 25, 2007.

(51) Int. Cl.
*G02B 6/44*     (2006.01)
*F16L 9/18*     (2006.01)
*F16L 11/00*    (2006.01)

(52) U.S. Cl.
USPC ............ 385/100; 138/114; 138/137; 138/140

(58) Field of Classification Search
USPC .......... 385/100–115; 138/114, 137, 140, 141, 138/149; 428/36.91
See application file for complete search history.

(56) References Cited

U.S. PATENT DOCUMENTS

| 5,046,815 A | 9/1991 | Cain et al. |
| 5,358,011 A | 10/1994 | Stockton et al. |

(Continued)

FOREIGN PATENT DOCUMENTS

| DE | 3734248 | 4/1989 |
| EP | 1310814 | 5/2003 |

(Continued)

OTHER PUBLICATIONS

Espacenet Abstract of JP63085511 (1988).

(Continued)

*Primary Examiner* — Uyen Chau N Le
*Assistant Examiner* — Michael Mooney
(74) *Attorney, Agent, or Firm* — John H. Hornickel; Maria M. Hoke

(57) ABSTRACT

A concentric insulation sleeve is disclosed having multi-layered structure. The outer layer exhibits low smoke and fume and non-halogen properties important for use of fiber optic cable assemblies in confined space susceptible to combustion conditions. The inner layer exhibits anti-static properties, and optionally slippery properties, to make the assembly of fiber strands in the insulation less charged with static electricity. The cable can become associated with other cables and serve as mini-ducts and then be surrounded by another insulation sleeve of the same construction to form a cable duct.

20 Claims, 1 Drawing Sheet

(56) References Cited

U.S. PATENT DOCUMENTS

| | | | |
|---|---|---|---|
| 6,389,204 B1* | 5/2002 | Hurley | 385/102 |
| 6,553,167 B2 | 4/2003 | Hurley et al. | |
| 6,718,101 B2* | 4/2004 | Le Noane et al. | 385/109 |
| 6,901,191 B2 | 5/2005 | Hurley et al. | |
| 7,447,406 B2 | 11/2008 | Sutehall et al. | |
| 7,687,556 B2 | 3/2010 | He et al. | |
| 2003/0004256 A1* | 1/2003 | Ogasawara et al. | 524/495 |
| 2003/0091307 A1* | 5/2003 | Hurley et al. | 385/109 |
| 2003/0114596 A1* | 6/2003 | Inagaki et al. | 525/240 |
| 2005/0013573 A1* | 1/2005 | Lochkovic et al. | 385/128 |
| 2007/0021535 A1 | 1/2007 | Wursche et al. | |
| 2007/0063363 A1 | 3/2007 | Sutehall et al. | |
| 2008/0044145 A1* | 2/2008 | Jenkins et al. | 385/113 |
| 2009/0326113 A1 | 12/2009 | Fortuyn et al. | |

FOREIGN PATENT DOCUMENTS

| | | |
|---|---|---|
| GB | 2258767 | 2/1993 |
| WO | WO2004114489 | 12/2004 |

OTHER PUBLICATIONS

Espacenet Abstract of JP2001091797 (2001).
Espacenet Abstract of JP2006317589 (2006).
Espacenet Abstract of KR20020074642 (2002).
"Fiberflow Micro Duct by emtelle" Product Literature www.emtelle.com (2002).

* cited by examiner

CONCENTRIC INSULATION SLEEVE HAVING INNER AND OUTER SURFACES WITH DIFFERENT PROPERTIES

CLAIM OF PRIORITY

This application claims priority from U.S. Provisional Patent Application Ser. No. 60/974,863 and filed on Sep. 25, 2007, which is incorporated by reference.

FIELD OF THE INVENTION

This invention concerns low smoke and fume, non-halogen (LSFOH) insulation for fiber optic cable.

BACKGROUND OF THE INVENTION

Combustion in a enclosed space is very dangerous to humans and other animals. The products of combustion can both poison and obscure exit points from the danger.

The wire and cable industry uses thermoplastic insulation to protect metal and glassy wires which convey electrical current or electrical optical signals or other information. At times of fire and other combustion, government and industry standards require the insulation to not contribute to the dangerous smoke and fumes that can be present. Very specialized insulation compounds have come to be identified as "low smoke and fume, zero-halogen" known by the acronym LSFOH. These compounds are used by manufacturers of wire and cable as insulation when the government or owner of the building or other structure requires the insulation to have LSFOH properties. PolyOne Corporation, www.polyone.com, is a manufacturer of ECCOH™ LSFOH compounds.

Manufacture of the wire or cable involves the placement of wire or fiber optic materials within a thermoplastic insulation sleeve or layer.

SUMMARY OF THE INVENTION

Unfortunately, it has been found that, during the manufacture of fiber optic cable, with many individual strands of fiber optic material being introduced inside the insulation, static charges can become a problem within the finished cable.

What the art needs is a wire and cable insulation compound that both provides LSFOH properties and also provides anti-static properties.

The present invention solves that problem by using concentric insulation that has an outer layer having LSFOH properties and an inner layer having anti-static properties.

One aspect of the invention is a multi-layered insulation sleeve, comprising a concentric inner insulation layer of thermoplastic compound having anti-static properties and a concentric outer insulation layer of thermoplastic compound having low smoke and fume and non-halogen properties.

Preferably, the inner insulation layer has a slippery surface to further assist the introduction of the individual strands of optical fiber into the sleeve.

Another aspect of the invention is a cable assembly comprising fibers and an insulation sleeve described above surrounding the fibers.

Another aspect of the invention is a multiple unit assembly, comprising a plurality of cables described above serving as "mini-ducts" and a multi-layered insulation sleeve, comprising a concentric inner insulation layer of thermoplastic compound having anti-static properties and a concentric outer insulation layer of thermoplastic compound having low smoke and fume and non-halogen properties.

Drawings help describe the embodiments of the invention.

EMBODIMENTS OF THE INVENTION

Insulation Structure

Figure 1:
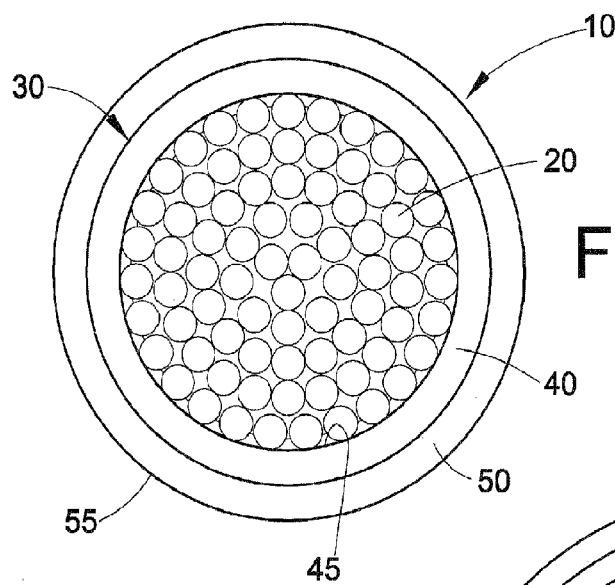
FIG. 1 is an end view of a fiber optic cable according to the present invention.

FIG. 1 shows a fiber optic cable 10 composed of many individual strands 20 surrounded by an insulation sleeve, generally 30. Sleeve 30 is composed of at least two different layers 40 and 50, respectively, disposed concentrically about the strands 20. Strands 20 contact inner surface 45 of layer 40. Outer surface 55 of layer 50 is exposed to the surrounding environment.

There can be as many as strands 20 as the diameter can accept within sleeve 30. Strands can introduced into the sleeve by different processes known in the art. The strands can be introduced before or after installation of the sleeve 30 into a building or other structure. Each of these strands can convey optical pulses and other transmissions to provide a communication pipeline between two other devices.

Strands can be made of various materials such as fiberglass, polyester, and other conventional fiber optic materials. The strands can also be coated with polymers. It has been found that each of these compounds has some level of capability to transmit and store electrical energy, usually an electrostatic charge, which is not desired and often disruptive to proper function of the fiber optic assembly. Static electricity in a fiber optic cable can disrupt proper function by creating sparks, breaking or interfering with the proper performance of the optical fiber, decreasing the operational capacity of the optical fiber, and other disruptions.

In those uses where fiber optic cable must have LSFOH properties, unfortunately, it has been found that conventional LSFOH compounds useful for cable insulation do not adequately dissipate such static electrical energy. It has also been found that, unfortunately, merely adding anti-static ingredients to a LSFOH compound will not adequately dissipate such electrostatic energy when the compound is made into fiber optic insulation and fiber optic strands later contact inner surfaces of the insulation sleeve.

Confronted with this problem, the concentric insulation sleeve 30 of the present invention has at least two layers. Inner layer 40 provides the anti-static properties at inner surface 45 vital to dissipate static electricity which is generated during fiber optic loading and otherwise deleteriously accumulates among the strands 20, especially at the interface between the outermost strands 20 and inner surface 45.

While inner surface 45 and layer 40 dissipates static electricity, outer layer 50 remains needed to provide the required LSFOH properties. Outer surface 55 has all of the traditional LSFOH properties vital to usefulness in construction of fiber optic cables which must provide the low smoke and fume and non-halogen properties required by building codes, industry requirements, or owner preference.

The diameter of fiber optic cable 10 can range from about 2 to about 20, and preferably from about 2 to about 14 mm. Of that dimensional range, the diameter of the strands, cumulatively, can range from about 0.1 to about 10 mm, and preferably from about 0.1 to about 7 mm. That leaves from about 0.1 to about 3, and preferably from about 0.4 to about 2 mm to serve as the total wall thickness of the insulation sleeve 30.

Inner layer can have a wall thickness ranging from about 1 μm to about 1 mm, and preferably from about 10 μm to about 200 μm.

Outer layer can have a wall thickness ranging from about 0.1 to about 3, and preferably from about 0.2 to about 2 mm.

Cable 10 can be nearly endless in length at time of manufacture. Rolls of cable 10 can have a length of at least from about 10 to about 100 meters.

Anti-Stat Compound for Inner Layer

Any thermoplastic material that is capable of dissipation of static electricity is a candidate for use as inner layer 40 of the present invention. Thermoplastic materials such as polyolefins, polyamides, polystyrenes, thermoplastic elastomers, and any derivatives of any of them, can be used. Those skilled in the art are aware of ingredients that contribute to dissipation of static electricity. Categories of anti-static chemicals include copolymers of polyamides, copolymers of polyesters, ethylene copolymers. Of these many types of anti-static agents, non-migratory anti-static agents are preferred because of their nearly permanent performance.

Of the many possible resin candidates, it has been found that use of a high density polyethylene resin is preferred because of mechanical properties needed for the assembly.

Commercially available compounds can be used for inner layer 40. Alternatively, commercially available concentrates (also called masterbatches) having anti-stat properties can be used to be diluted or "let-down" into thermoplastic resin which then serves as inner layer 40.

Non-limiting examples of commercially available polymeric materials include OnCap™ No. CC10084327BG or OnCap™ No. CC10084328BG, both available from PolyOne Belgium S.A., of Assesse, Belgium www.polyone.com. Both of these products contain a nearly permanent anti-static agent in high density polyethylene. CC10084327BG polymer material also contains a silicone oil, which is optional but preferred to reduce the surface energy and reduce friction and create a slippery surface at the interface where the strands 20 move past inner surface 45 of inner layer 40 during manufacture of the fiber optic cable.

Alternatively, one can make a concentrate or a compound utilizing Entira™ AS 500 or Entira™ SD100 brand hygroscopic ionomer resins to serve as polymeric anti-stats. Recently brought to the marketplace, Entira™ brand anti-stats are commercially available from DuPont and can be dispersed into polyolefins and other polymers to serve as such concentrates or compounds. The amount of polymeric anti-stat can be any amount that is minimally effective and not wasteful, as would be known to one of ordinary skill in the art. Typical weight percents for compounds range from 10-30%, as reported by DuPont. Concentrates can contain higher levels for later dilution upon compounding.

LSFOH Compound for Outer Layer

Any conventional LSFOH compound is a candidate for layer 50 of cable 10. The ECCOH™ and ECCOH™ PF LSFOH product lines of PolyOne Belgium S.A. are all candidates, with the choice by those skilled in the art being dependent on the particular governmental or industrial requirements.

Presently preferred for layer 50 are ECCOH™ PF 2037 and ECCOH™ PF 4142 LSFOH compounds.

Multi-Layered Structure

While one embodiment of the invention has two layers, it is to be understood that any multi-layered structure of three or more layers can also be used in the present invention, with an anti-stat compound serving as the innermost layer and the LSFOH compound serving as the outermost layer. For example, if electromagnetic shielding is needed, a third layer can provide that property.

Use of Cables as Miniducts

Figure 2:
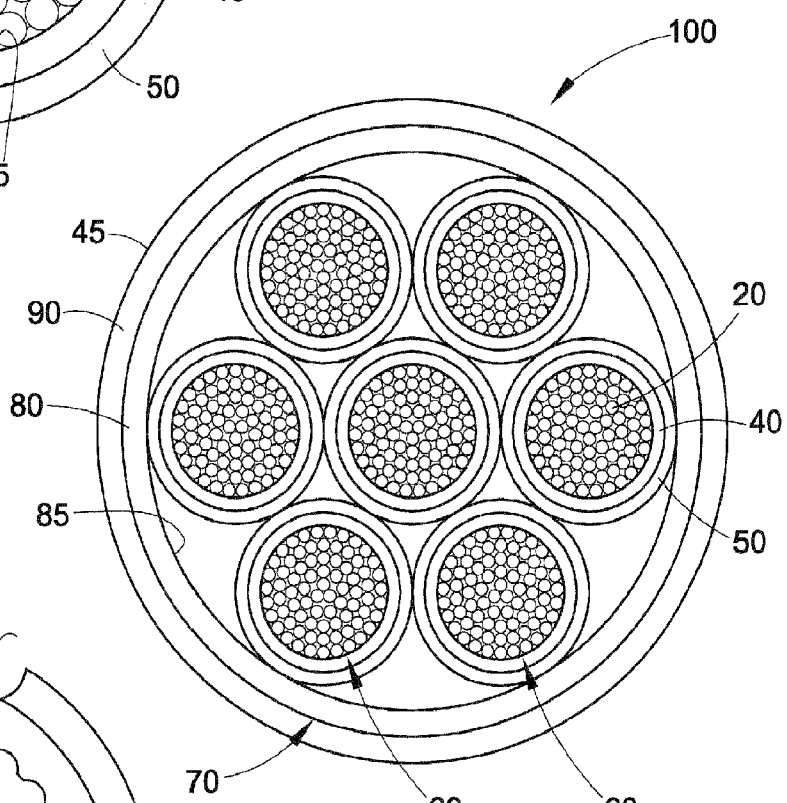
FIG. 2 is an end view of a fiber optic duct bundling several fiber optic miniducts inside.

FIG. 2 shows a plurality of cables 10 serving as "mini-ducts" (each labeled as 60) arranged within larger insulation sleeve, generally 70, which comprises an inner insulation layer 80 and an outer insulation layer 90. As many as about 19 mini-ducts 60 can reside within a cable duct 100. Each mini-duct 60 can have the same construction from the same materials as that seen in FIG. 1. Moreover, the construction and materials of inner insulation layer 80 can match that of inner insulation layer 40 for each mini-duct 60, the construction and materials of outer insulation layer 90 can match that of outer insulation layer 50. In this respect, duct 100 is a fractal amplification of miniducts 60, each of which in turn is an essential repeat of the structure of cable 10.

Therefore, inner surface 85 of inner insulation layer 80 provides anti-static properties for mini-ducts 60 in the same way that inner surface 45 provides anti-static properties for fiber optic strands 20. Also, outer surface 95 of outer insulation layer 90 provides low smoke and fume and non-halogen properties for fiber optic cable duct 100 to meet industry standards, governmental requirements, or owner preference in construction which requires the laying of duct 100 for fiber optic communication.

It is also conceivable that insulation sleeve 70 can be a multi-layered structure having at least three layers, with inner insulation layer 80 and outer insulation layer 90 being separated by one or more layers that provide other functional features for sleeve 70.

It is also conceivable that a plurality of cable ducts 100 might be encased in a sleeve of insulation. If so, by fractal analogy, one can provide a concentric cable insulation of two layers with the innermost layer providing anti-static properties and the outermost layer providing low smoke and fume and non-halogen properties.

Optional Inner Surface

Figure 3:
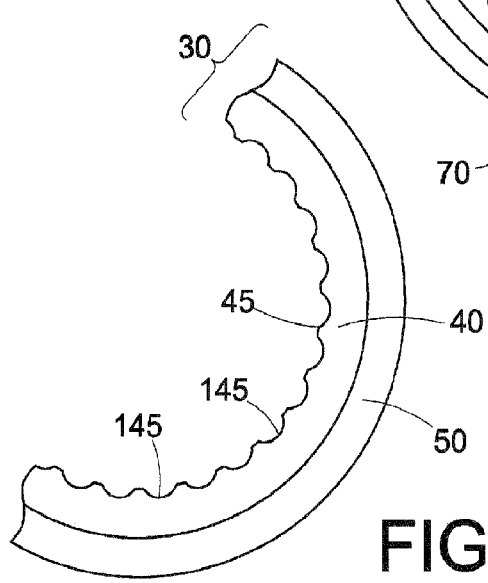
FIG. 3 is a magnified view of the inner surface of the insulation where fiber strands interact with the surface.

FIG. 3 shows an exploded view of inner surface 45 of FIG. 1 to identify an optional feature of the invention. Inner surface can be engineered at time of manufacture to have an undulating surface 145 of grooves which can assist the transit of fiber optic strands during the time of manufacture of cable 10 in conjunction with the use of appropriate tooling.

Other Optional Additives

Either layer compound of a flame retardant insulation sleeve of the present invention can include conventional plastics additives in an amount that is sufficient to obtain a desired processing or performance property for the compound. The amount should not be wasteful of the additive nor detrimental to the processing or performance of the compound. Those skilled in the art of thermoplastics compounding, without undue experimentation but with reference to such treatises as *Plastics Additives Database* (2004) from Plastics Design Library (www.williamandrew.com), can select from many different types of additives for inclusion into the compounds of the present invention.

Non-limiting examples of such optional additives include, in addition to those already described, adhesion promoters; biocides (antibacterials, fungicides, and mildewcides), antifogging agents; bonding, blowing and foaming agents; dispersants; fillers and extenders; fire and flame retardants and smoke suppressants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; and combinations of them.

Processing

The preparation of compounds of the present invention is uncomplicated. The compound of the present invention can be made in batch or continuous operations, either as a fully "let-down" compound or as masterbatches for later dilution with compatible thermoplastic resin(s).

Mixing in a continuous process typically occurs in a single or twin screw extruder that is elevated to a temperature which is sufficient to melt the polymer matrix with addition of other ingredients either at the head of the extruder or downstream in the extruder. Extruder speeds can range from about 50 to about 500 revolutions per minute (rpm), and preferably from about 100 to about 300 rpm. Typically, the output from the extruder is pelletized for later extrusion or molding into polymeric articles.

Mixing in a batch process typically occurs in a Banbury mixer that is capable of operating at a temperature which is sufficient to melt the polymer matrix to permit addition of the solid ingredient additives. The mixing speeds range from 60 to 1000 rpm. Also, the output from the mixer is chopped into smaller sizes for later extrusion or molding into polymeric articles.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.williamandrew.com), one can make articles of any conceivable shape and appearance using compounds of the present invention.

In the manufacture of insulation sleeves 30 and 70 for cables 10 and cable duct 100, respectively, from compounds, co-extrusion of layers 40 and 50 and 80 and 90, respectively, can be performed using the following equipment operating at the following speeds and the following temperatures:

equipment: single or twin screw extruder
range of speed: 10 to 1000 rpm
range of extrusion temperature: 80 to 300° C.

Optionally, extrusion of insulation sleeve 70 about a plurality of miniducts 60 follows in those circumstances when a cable assembly seen in FIG. 2 is being produced.

Thereafter, insulation sleeve 30, or insulation sleeve 70 (with a plurality of miniducts 60 therein) can be installed in a building or other structure to be ready for introduction of fiber optic strands 20 to make cables 10 or cable duct assembly 100. Alternatively, fiber optic strands 20 can be inserted into a length of insulation sleeve 30 or insulation sleeve 70 before those sleeves are installed into the building or other structure. Either way, sleeves 30 are extruded and ready for use to make cable 10 or duct 100, respectively, by having an antistatic inner surface 45 or 85, respectively, being prepared for insertion of fiber optic strands 20 within the sleeve 30 or 70, respectively.

Alternatively, the extrusion of insulation sleeve 30 or 70 can begin by employing anti-stat masterbatches and compatible thermoplastic resin to make the inner layer 40 or 80, respectively, and/or by employing LSFOH masterbatches and compatible thermoplastic resin to make the outer layer 50 or 90, respectively. The rate of "let-down" or dilution of the masterbatch(es) into the resin(s) for co-extrusion into sleeve 30 or 70 is a function of the concentration of the applicable functional additive in the masterbatch carrier(s) and well within the techniques of those skilled in the art. For example, one can utilize a LSFOH compound and the combination of an anti-stat masterbatch and compatible resin to make insulation sleeve 30 or 70.

USEFULNESS OF THE INVENTION

Cables 10 or 100 (containing a plurality of miniducts 60) can be used to transport optical communication signals while also limiting the amount of smoke and fumes and minimizing the amount of halogens exposed to humans and other animals if such assemblies were to be in a space where unwanted combustion has begun.

All of the benefits of a LSFOH insulation are provided while also providing an anti-static inner surface of the insulation sleeve, in order to limit or minimize the amount of static electricity present in the optical communication fiber optic strands.

The invention is not limited to the above embodiments. The claims follow.

What is claimed is:

1. A multi-layered insulation sleeve, comprising:
   (a) a concentric inner insulation layer of thermoplastic compound comprising a polymeric anti-static agent in a high-density polyethylene, and
   (b) a concentric outer insulation layer of thermoplastic compound having low smoke and fume and non-halogen properties,
   wherein the inner insulation layer has a wall thickness of from about 10 µm to about 200 µm.

2. The insulation sleeve of claim 1, wherein the thermoplastic compound of the concentric inner insulation layer also has slippery surfaces.

3. The insulation sleeve of claim 1, wherein the outer insulation layer has a wall thickness of from about 0.3 to about 3 mm.

4. The insulation sleeve of claim 1, wherein the sleeve has a diameter of from about 2 to about 20 mm.

5. A cable comprising:
   (a) fibers and
   (b) an insulation sleeve of claim 1 surrounding the fibers.

6. The cable of claim 5, wherein the fibers are optical fibers.

7. The cable of claim 5 wherein the cable is a mini-duct.

8. A multiple unit assembly, comprising:
   (a) a plurality of mini-ducts of claim 7, and
   (b) a multi-layered insulation sleeve, comprising:
      (1) a concentric inner insulation layer of thermoplastic compound having anti-static properties and
      (2) a concentric outer insulation layer of thermoplastic compound having low smoke and fume and non-halogen properties.

9. A method of using an insulation sleeve of claim 1, comprising the step of dissipating static electricity resident on optical fibers by conducting such static electricity through the inner insulation layer of the sleeve.

10. The insulation sleeve of claim 2, wherein the outer insulation layer has a wall thickness of from about 0.3 to about 3 mm.

11. The insulation sleeve of claim 2, wherein the sleeve has a diameter of from about 2 to about 20 mm.

12. The cable of claim 5, wherein the thermoplastic compound of the concentric inner insulation layer of the insulation sleeve also has slippery surfaces.

13. The cable of claim 5, wherein the outer insulation layer has a wall thickness of from about 0.3 to about 3 mm.

14. The cable of claim 5, wherein the outer insulation sleeve has a diameter of from about 2 to about 20 mm.

15. The assembly of claim 8, wherein the thermoplastic compound of the concentric inner insulation layer of the insulation sleeve also has slippery surfaces and wherein the sleeve has a diameter of from about 2 to about 20 mm.

16. The method of claim 9, wherein the thermoplastic compound of the concentric inner insulation layer of the insulation sleeve also has slippery surfaces.

17. The method of claim 9, wherein the sleeve has a diameter of from about 2 to about 20 mm.

18. The insulation sleeve of claim 1, wherein the thermoplastic compound of the inner insulation layer further comprises a silicone oil.

19. The insulation sleeve of claim 1, wherein the polymeric anti-static agent is selected from the group consisting of copolymers of polyamides, copolymers of polyesters, ethylene copolymers, and hygroscopic ionomer resins.

20. A multi-layered insulation sleeve, comprising:
   (a) a concentric inner insulation layer of thermoplastic compound having anti-static properties, and
   (b) a concentric outer insulation layer of thermoplastic compound having low smoke and fume and non-halogen properties,
   wherein the inner insulation layer has an inner surface comprising an undulating surface of grooves.

* * * * *